United States Patent
Ho et al.

(10) Patent No.: US 7,172,046 B2
(45) Date of Patent: Feb. 6, 2007

(54) FOUR-WHEEL DRIVE COMBINE WITH SLIP CONTROL

(75) Inventors: Yun Ren Ho, Naperville, IL (US);
Bernard Johnson, Oxford, MI (US);
Branko J. Horvat, Jr., Gilbert, IA (US); John E. Bundy, East Aurora, NY (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/368,943

(22) Filed: Mar. 6, 2006

(65) Prior Publication Data

US 2006/0243511 A1   Nov. 2, 2006

Related U.S. Application Data

(62) Division of application No. 11/119,523, filed on Apr. 30, 2005, now Pat. No. 7,121,374.

(51) Int. Cl.
*B60K 17/356* (2006.01)

(52) U.S. Cl. .............. 180/242; 180/197; 180/307; 701/89

(58) Field of Classification Search ............... 180/242, 180/307, 197; 701/89, 90, 82
See application file for complete search history.

(56) References Cited

U.S. PATENT DOCUMENTS

| | | | |
|---|---|---|---|
| 4,103,489 A * | 8/1978 | Fletcher et al. | 60/395 |
| 4,164,872 A | 8/1979 | Weigl | |
| 4,818,037 A | 4/1989 | McEnnan | |
| 5,371,677 A | 12/1994 | Ehret et al. | |
| 5,574,643 A | 11/1996 | Yesel | |
| 5,629,850 A | 5/1997 | Okawa | |
| 5,668,724 A | 9/1997 | Ehret et al. | |
| 5,860,480 A | 1/1999 | Jayaraman et al. | |
| 5,867,803 A | 2/1999 | Kim et al. | |
| 6,061,622 A | 5/2000 | Probst | |
| 6,125,318 A | 9/2000 | Zierlof | |
| 6,135,231 A * | 10/2000 | Reed | 180/308 |
| 6,151,546 A | 11/2000 | Schmitt et al. | |
| 6,176,336 B1 | 1/2001 | Bourne et al. | |
| 6,695,693 B2 | 2/2004 | Ho et al. | |
| 6,702,666 B2 | 3/2004 | Ho et al. | |

* cited by examiner

*Primary Examiner*—Kevin Hurley
(74) *Attorney, Agent, or Firm*—Michael G. Harms; John William Stader; Stephen A. Bucchianeri

(57) ABSTRACT

An agricultural combine has a variable displacement pump connected to four drive motors that drive four wheels. An electronic controller monitors the speed of each wheel and reduces the torque of the motor that drives the wheel when the wheel slips. The controller reduces the torque by reducing the specific displacement of the slipping motor. Once the wheel has ceased slipping, the controller increases the specific displacement of the motor back to its original displacement.

3 Claims, 3 Drawing Sheets

FOUR-WHEEL DRIVE COMBINE WITH SLIP CONTROL

This divisional application claims priority under 35 U.S.C. § 120 from U.S. patent application Ser. No. 11/119, 523 filed on Apr. 30, 2005 now U.S. Pat. No. 7,121,374 by Yun Ren Ho et al. with the same title, the full disclosure of which is hereby incorporated by reference.

FIELD OF THE INVENTION

The invention relates to agricultural combines and systems for controlling their operation. More particularly, it relates to four-wheel drive system for combines.

BACKGROUND OF THE INVENTION

Agricultural combines typically have two driven wheels to propel them through the field. The use of two driven wheels limits their performance. With only two driven wheels, combines are prone to slip. To avoid this problem, prior art combines were designed that use a four wheel drive arrangement in which hydraulic fluid from a hydraulic pump is directed to a single motor coupled to two front wheels to drive the front wheels and fluid is also directed to two motors, each motor driving a single rear wheel. This arrangement required the use of a flow splitter circuit that divides the output of the flow between the front wheels' drive motor and the rear wheels' drive motors. The flow splitting circuit was designed to insure that some flow was forced though the front drive motor as well as through the two rear drive motors. In this fashion, if a front wheel slipped, all the hydraulic fluid would not be directed through the front drive motor and bypass the rear drive motors. Instead, and due to the arrangement of the splitter, at least a portion of the flow would be forced through the rear drive motors. By dividing the flow and insuring that at least a portion of the flow would go through both the front motor and the rear motors even when there was slippage of a wheel, slippage of a single wheel would not cause the combine to immediately stop moving, since at least some fluid would continue to drive other motors coupled to wheels that have good ground contact.

This system, however, has drawbacks. It requires the use of a hydro-mechanical flow splitter. Furthermore, it still permitted both front wheels to be disabled as soon as one of them started slipping and for both rear wheels to be disabled as soon as one of them started slipping.

It is an object of this invention to provide a combine with an improved anti-slip drive system.

It is an object of this invention to provide a drive system that can isolate any individual drive wheel that begins slipping.

It is an object of this invention to prevent the slippage of a wheel by controlling the specific displacement of the motor that drives the slipping wheel.

It is an object of this invention to prevent the slippage of a wheel by reducing the torque provided by the motor driving that wheel.

These and other objects of the invention will become clear upon reading the following summary and detailed description of a preferred embodiment of the invention.

SUMMARY OF THE INVENTION

In accordance with a first aspect of the invention an agricultural combine is provided including a chassis; an internal combustion engine mounted on the chassis; a rotor configured to thresh agricultural plant matter, the rotor coupled to the engine to be driven thereby; a header fixed to the front of the chassis and disposed to gather and cut the agricultural plant matter; a ground drive system including a variable displacement hydraulic pump coupled to the engine to be driven thereby, four variable displacement hydraulic motors coupled together in parallel to one another and coupled in series with the hydraulic pump to be driven by the pump, and four ground-engaging wheels, each wheel coupled to an associated one of the four hydraulic motors to be driven thereby; and an electronic control system including four speed sensors, each sensor disposed to sense the rotational velocity of a corresponding one of the motors or a corresponding one of the wheels, a means for determining the speed of the vehicle, and an electronic controller coupled to the four speed sensors, and the means for determining and configured to limit the slippage of each of said four wheels individually by controlling the specific displacement of a motor drivingly coupled to said each of said four wheels.

In accordance with a second aspect of the invention, a method for reducing wheel slip in the combine is provided, including the steps of electronically retrieving a first wheel speed from one of the four speed sensors, comparing the first retrieved speed with a reference speed, reducing the torque applied by the motor associated with said one of the four speed sensors based upon the results of the step of comparing the first speed, electronically retrieving a second wheel speed from said one of the four speed sensors after the step of reducing the torque; comparing the second retrieved speed with the reference speed; and reducing the torque applied by the motor associated with said one of the four speed sensors based upon the results of the step of comparing the second speed; and increasing the torque applied by the motor associated with said one of the four speed sensors based upon the results of the step of comparing the second speed.

In accordance with a third aspect of the invention a ground drive system for a combine is provided, the system including a plurality of ground drive wheels; a plurality of variable displacement and reversible hydraulic motors, each motor coupled to a corresponding one of the plurality of ground drive wheels; a variable displacement and reversible hydraulic pump coupled in parallel to the plurality of hydraulic motors to drive the motors in rotation; a plurality of speed sensors, wherein each speed sensor is associated with a corresponding wheel of the plurality of wheels to sense the rotational speed of the corresponding wheel; and an electronic controller coupled to the plurality of motors to control their displacement, the plurality of speed sensors to receive signals indicating the speed of the plurality of wheels; and to the pump to control its displacement; wherein there are no valves disposed between the pump and the motors to throttle the flow of hydraulic fluid.

The plurality of wheels may include four wheels, the plurality of motors include four motors and the plurality of sensors include for sensors. The electronic controller may be configured to independently control the rotational speed and direction of the plurality of hydraulic motors. The pump may be an overcenter pump. The electronic controller may calculate the pump displacements and the motor displacements to satisfy the operational requirements. The operational requirements may be to prevent the wheels from slipping, two prevent the wheels from locking, or to power turn the vehicle.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
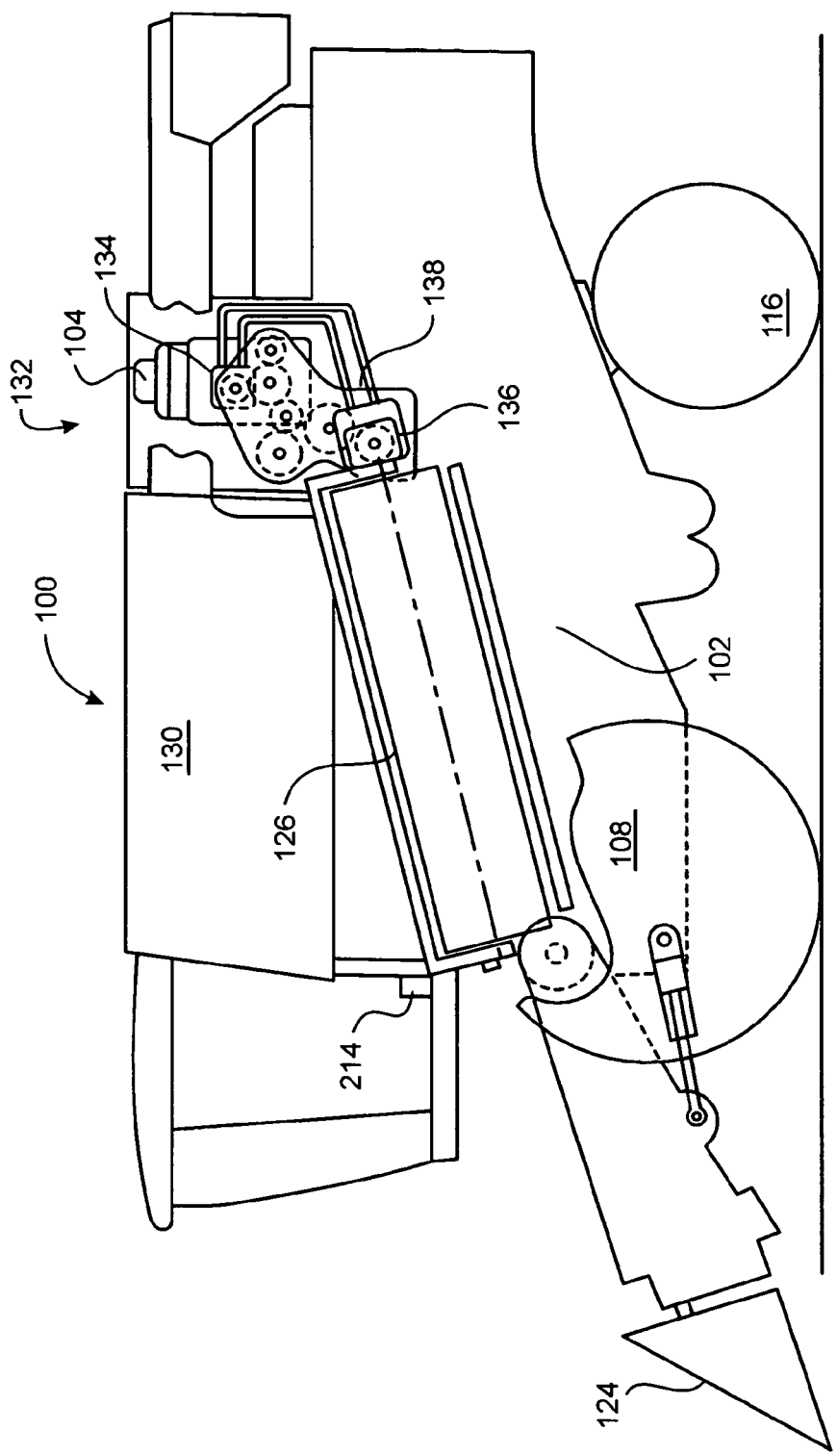
FIG. 1 is a side schematic view of an agricultural combine having a hydraulic ground wheel drive system.
Figure 2:
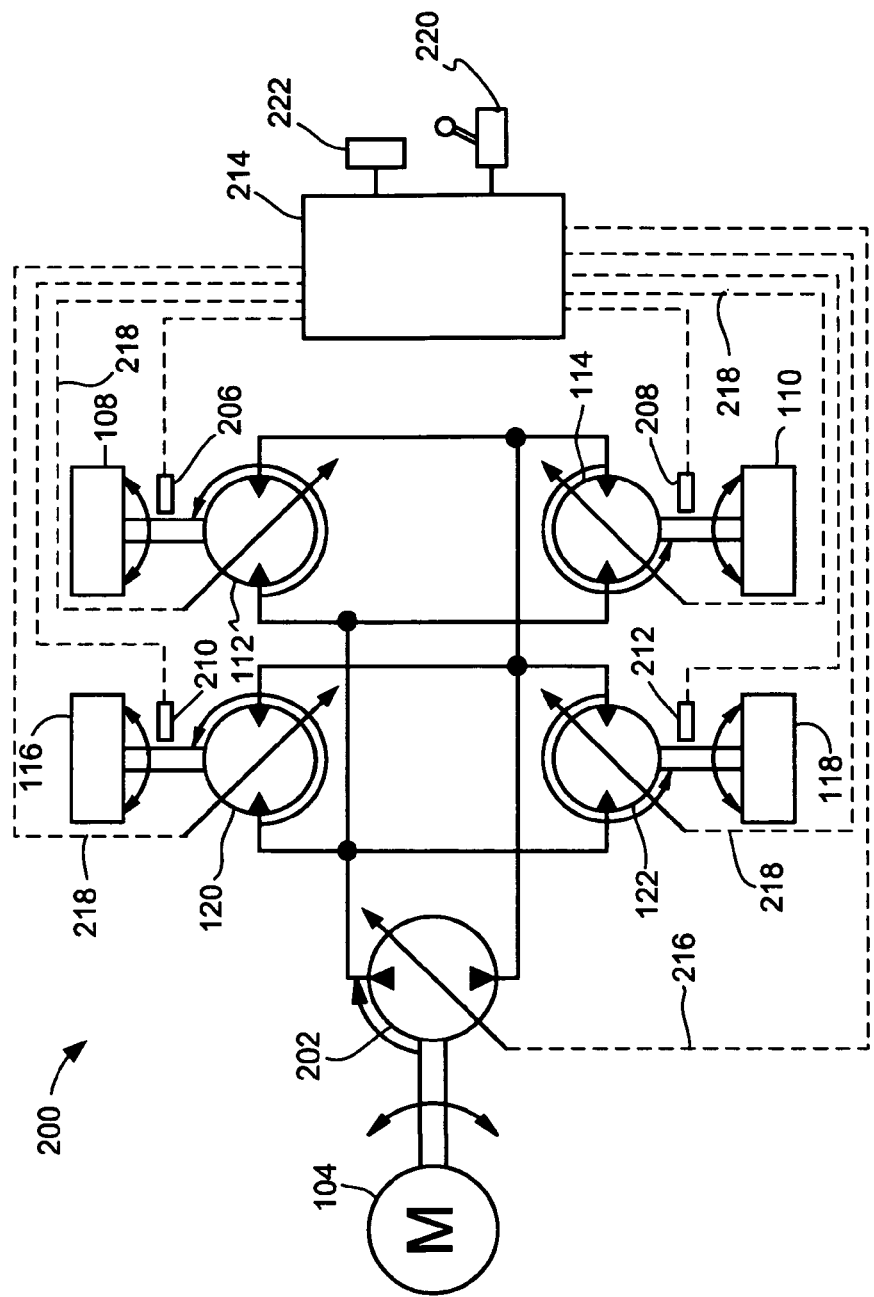
FIG. 2 is a schematic diagram of the ground wheel drive system of the combine of FIG. 1 including a variable displacement pump, four variable displacement motors, and an electronic controller configured to control the pump and motors in accordance with an internal control program.

Referring to FIGS. 1 and 2, a work vehicle is illustrated, shown as an agricultural combine 100. The combine has a chassis 102 on which an engine 104 is mounted.

Two front wheels 108 and 110 are mounted on opposing sides of the front of the vehicle and are driven by corresponding hydraulic motors 112 and 114 to which they are coupled.

Two rear wheels 116 and 118 are mounted on opposing sides of the rear of the vehicle and are driven by corresponding hydraulic motors 120 and 122 to which they are coupled.

The front and rear wheels are ground-engaging wheels that are coupled to the chassis both to drive the combine and to support the weight of the combine as it travels over the ground.

A header 124 is mounted to the front of the chassis, extending forward from the front of the chassis to harvest agricultural crops.

A rotor 126 is mounted centrally in the chassis, and extends longitudinally with respect to the vehicle. The rotor is disposed to mechanically engage the harvested agricultural crop material as it rotates to thereby separate grains or seeds in the harvested agricultural crops from associated leaves and stems.

A grain tank 130 is mounted on the chassis and is disposed to receive the grains or seeds threshed by the header.

Rotor 126 is driven by a drive system 132 that is coupled to the rearward end of the rotor. The drive system 132 includes hydraulic pump 134 that is coupled to and driven by the engine, hydraulic motor 136 that is fluidly coupled to and driven by pump 134, a planetary gear arrangement, a gear train coupling engine 104 to the pump and the planetary gear arrangement, and gearbox 138 that drives combine rotor 126.

FIG. 2 illustrates the ground wheel drive system 200 of the combine. Ground wheel drive system 200 includes a variable displacement hydraulic pump 202 that is coupled to and driven by engine 104, four variable displacement hydraulic motors 112, 114, 120, and 122 that are connected in parallel to pump 202, four motor (or wheel) speed sensors 206, 208, 210, and 212 that are coupled to the motors to generate a signal indicative of the wheel speed, and an electronic controller 214 that is coupled to pump 202, to motors 112, 114, 120, and 122, and to the four wheel speed sensors 206, 208, 210, and 212. The capabilities of controller 214 are discussed below. Any capability or functionality that is attributed to the controller herein is provided by an integral control program stored in controller 214 to control its operation.

Hydraulic pump 202 is a bidirectional pump that has a variable displacement. Its displacement can be varied electronically by applying an electrical signal proportional to the desired displacement to electrical signal line 216. Electrical signal line 216 is coupled to and between controller 214 and pump 202. Controller 214 is configured to generate an electrical signal and apply that signal to line 216 to change the specific displacement of pump 202. In a preferred embodiment, controller 214 generates a current signal in which the magnitude of the current is proportional to the desired displacement of the pump. Controller 214 applies this signal to line 216 and pump 202 responsively changes its specific displacement. The manner in which controller 214 changes the displacement of pump 202 to reduce wheel slip is discussed below in greater detail.

Hydraulic motors 112, 114, 120, and 122 are coupled to and drive wheels 108, 110, 116 and 118, respectively. The motors are positive displacement motors having a variable specific displacement. Each motor has an electrical signal line 218 that is coupled to and between that motor and controller 214. Controller 214 transmits a signal indicative of a desired motor displacement to each motor over its associated signal line 218. Upon receipt of this signal, the motor responsively changes its specific displacement. The manner in which controller 214 generates and transmits this signal is discussed below in greater detail.

Sensors 206, 208, 210, and 212, provide a speed signal indicative of the speed of their associated wheels or motors to controller 214. They generate a speed signal that is proportional to the speed of rotation of their associated wheels or motors and transmit that signal to controller 214. In the preferred embodiment, the sensors are integral with the motors and generate a train of electrical pulses, each such pulse indicating a predetermined fractional rotation of the motor. As the motor rotates at a higher velocity, the rate at which the pulses are generated and transmitted to controller 214 increases proportionately.

Electronic controller 214 includes a digital microprocessor coupled to a ROM memory, a RAM memory and an input/output (I/O) circuit, all coupled together over a digital communications bus in a conventional manner. The ROM memory stores the control program that controls the operation of the microprocessor to function in accordance with the description herein. The RAM memory is used primarily as a dynamic temporary storage space for values generated by the microprocessor. The I/O circuit includes drivers that receive digital signals from the microprocessor and convert them into the signals that are applied to the pump and motors. The I/O circuit also includes signal conditioning circuitry that receives signals from the devices (such as the sensors) and conditions it for processing by the microprocessor A command speed input device 220 is coupled to controller 214 and is manually operable by the machine operator to change the command speed of the vehicle. The input device may be a quadrant lever, a switch or plurality of switches, and may include a shaft encoder, a potentiometer or the like to indicate to controller 214 that the operator desires to change the commanded speed. When the operator manipulates input device 220, controller 214 senses a change in the electrical signal generated by the input device and changes the commanded speed accordingly.

An external or internal speed reference 222 is also coupled to controller 214 to indicate the actual speed of the vehicle. This device may include a satellite navigation receiver such as a GPS receiver. It may also include a ground reflective radar sensor that determines vehicle velocity by way of a radar signal reflected off the ground. Reference 222 transmits a signal indicative of the ground speed of the vehicle to controller 214, which derives the speed of the vehicle from the signal indicative of ground speed and uses that speed in the manner described below.

Alternatively, controller 214 may derive the actual vehicle speed using an internal reference, such as a mathematical model of the vehicle. In such instances, controller 214 is configured to determine the speed of the vehicle by deriving it from one or more of the wheel speed sensors.

The hydraulic circuit coupling the motors and the pump is a series/parallel circuit. Each motor is coupled in series to the pump to form an individual series hydraulic circuit, such that fluid from the pump outlet passes into a hydraulic fluid inlet of the motor, through that motor, out the hydraulic fluid outlet of the motor and back into the hydraulic fluid inlet of the pump. This relationship is true of all the motors with respect to the pump.

At the same time, the motors are connected in parallel with each other. The hydraulic fluid inlets of all the motors are coupled together and fed in common by the hydraulic fluid outlet of the pump, and the hydraulic fluid outlets of all the motors are coupled together to form a common return line to the hydraulic fluid inlet of the pump. The terms "inlet" and "outlet" are figurative; in the preferred embodiment, since the flow can change direction. Thus, an inlet with flow in one direction would become an outlet when flow travels in the other direction.

Since the motors are connected in parallel to the pump, the pump simultaneously supplies fluid to all four of the hydraulic motors. There is no flow splitter disposed between the pump and the motors to divide the flow in specific proportions in the event. If it were not for the slip control features of the present invention, a wheel that loses contact with the ground could overspeed, consume all the available hydraulic fluid. The other motors would soon slow to a halt, and the vehicle would be stranded. The purpose of the slip control is to prevent such an overspeed condition by reducing the torque generated by a slipping wheel until it regains good contact with the ground and stops slipping, as shown in FIG. 3.

The motors are connected in parallel with no load-balancing or load-shifting valves disposed between the pump an the motor. In prior art devices, such valves were provided to insure (for example) that when one wheel and motor begins to slip and spin, all the hydraulic fluid flow did not go through that motor, thereby stalling the other wheels. In the present configuration, the electronic controller is configured to sense such conditions and to responsively and independently regulate the flow of hydraulic fluid to each motor by independently controlling the displacement of that motor, as will be described below in the context of the system's anti-slip capabilities.

Figure 3:
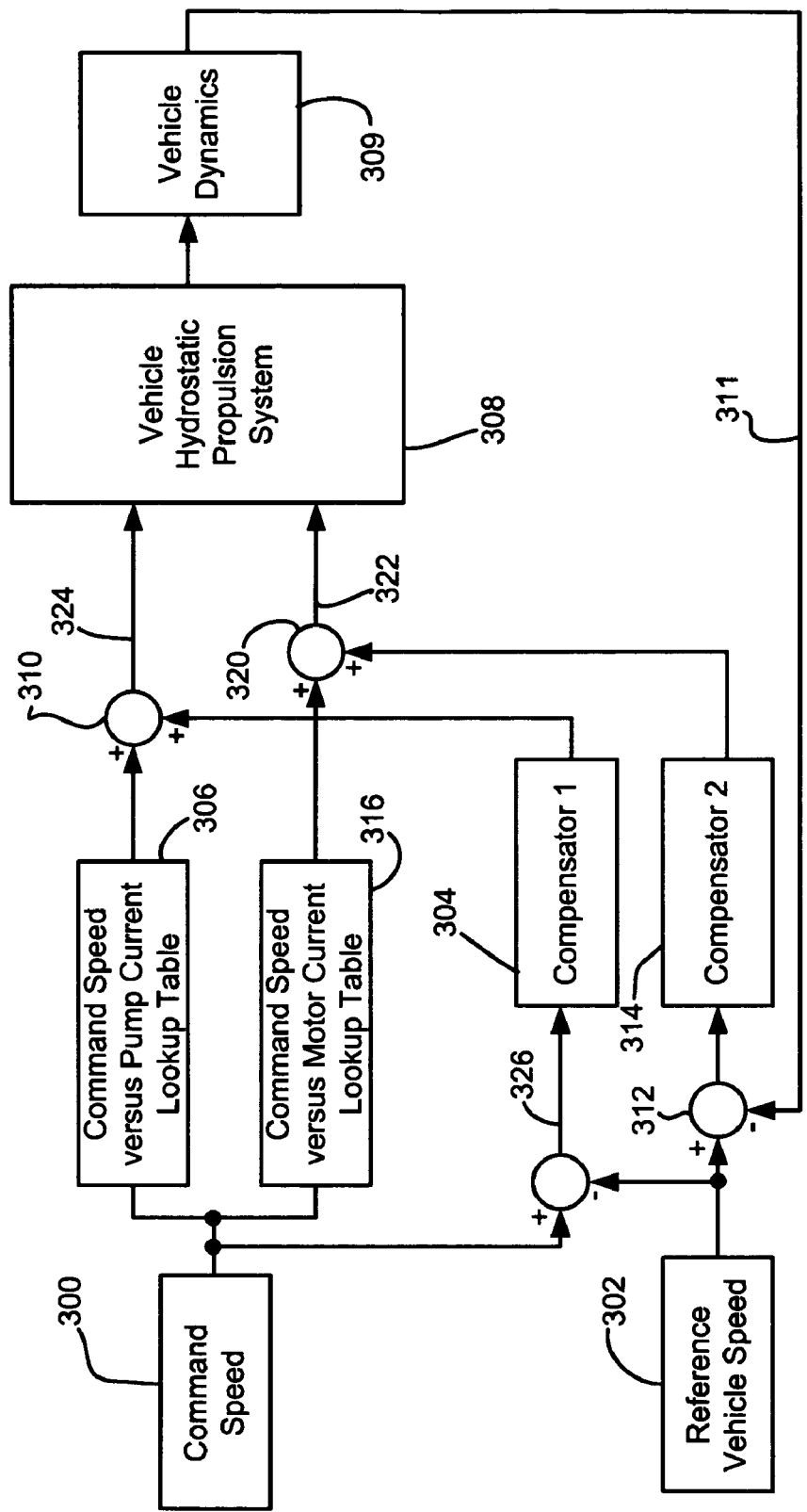
FIG. 3 is a block diagram of a portion of the slip control and speed control circuitry of the electronic controller.

FIG. 3 is a block diagram of a portion of the wheel slip and speed control circuit of controller 214. The circuit is preferably embodied as a sequence of computer instructions that configure controller 214.

For convenience, FIG. 3 illustrates one wheel slip and speed control circuit. There are four such circuits, one for each wheel 108, 110, 116, 118, its associated motor 112, 114, 120, 122 and its associated sensor 206, 208, 210, 212, respectively. The other three circuits have been removed for ease of illustration and explanation, but they operate in the same manner as the circuit shown in FIG. 3 and described below. For example, in FIG. 3, controller 214 is shown as using the speed signal 311 from one speed sensor of one wheel and motor combination to compensate in block 314 for slippage of that wheel. Controller 214 calculates four such compensations for slippage, one compensation for each of the four driven wheels of the vehicle. The circuit of FIG. 3 can be considered to have four compensator circuits 314, one for compensating each drive motor and wheel, to thereby permit the displacement of each motor, the speed of each motor, and the slip of each motor to be separately and independently controlled.

Vehicle speed is controlled by using a desired or commanded speed (block 300) provided by input device 220 as a first input and an actual vehicle speed (block 302) provided by the external or internal speed reference 222 as a second input. These two are combined and are applied to the pump 202 (in block 308) to vary the pump displacement accordingly.

Block 308 represents the vehicle hydrostatic propulsion system, which includes motors 112, 114, 120, 122 and pump 202. The two lines entering block 308 represent the signals applied to the motors and the signals applied to the pump to change their displacements. Block 309 represents the dynamic response of the vehicle cause by changes in displacement, such as changes in vehicle speed, motor speed and wheel speed and wheel slippage. Line 311 represents motor speed signals fed back to controller 314 from the wheel/motor speed sensors 206, 208, 210, 212.

As the vehicle speeds up or slows down, the reference or actual speed (block 302) changes, and controller 214 calculates a different displacement setting for pump 202. This revised displacement setting is applied as an electrical signal on signal line 216 extending from the controller to the pump to vary its displacement.

Controller 214 includes a lookup table 306 that is referenced by the microprocessor of controller 214 to retrieve the default pump displacement signal that corresponds to the operator commanded speed. When the operator changes the speed in block 300, controller 214 uses lookup table 306 to determine the corresponding current signal. This signal represents the displacement setting of the pump. Controller 214 applies this signal to pump 202 and the pump sets its displacement as commanded. The pump displacement setting provided by lookup table 306 is a default pump displacement setting. This default displacement, however, may not provide exactly the desired speed, due to differences in wheel size or inflation, or differences in the texture of the soil, for example. For that reason, a compensator circuit 304 is provided which compensates for this default pump displacement by adjusting it slightly. These two signals, the default displacement signal from the pump lookup table 306 and the output of the compensator circuit 304 are summed together at summing junction 310 and are transmitted over line 324 to the pump to change its displacement in block 308.

Compensator circuit 304 calculates the signals that regulate speed to maintain traction and reduce wheel slip. It is preferably embodied as a portion of the control program executed by controller 214. Compensator circuit 304 preferably includes a PID feedback control program stored in the ROM of controller 214 that generates a signal calculated to minimize the difference between the vehicle commanded speed (block 300) and the vehicle actual speed (block 302). This difference is provided to compensator circuit 304 on line 326.

It should be understood that compensator circuit 304 is not limited to a PID feedback control algorithm but may include additional or alternative logic to compensate for other vehicle dynamic factors such as unique operating conditions, non-linear response characteristics, and unstable conditions in which a standard PID feedback control program alone will not work.

Each wheel may slip. "Slipping" in this sense is defined as the wheel not turning at the same speed as the vehicle is moving across the ground. Not all slip is bad, however. In agricultural tractors, for example, a certain limited amount of slip permits each wheel to transfer more power to the ground. Thus, "reducing slip" should not be understood as eliminating it, since a residual slip may be beneficial.

Whether or not the vehicle is at the target or command speed, wheel slip needs to be controlled (or prevented, depending upon the application). The function of reducing wheel slip is the second function provided by controller 214. This capability is also illustrated in FIG. 3.

Each wheel is equipped with a speed sensor that generates a signal indicative of the speed of rotation of the wheel (FIG. 2). Controller 214 monitors the speed of rotation of each wheel, compares it with the actual speed (block 302) of the vehicle (at comparison block 312) and uses this comparison as an input to a second compensator circuit 314. The second compensator circuit 314 preferably includes a PID feedback control loop to determine the proper compensation. The second compensator circuit and its PID control loop are configured to individually the wheel's specific displacement to reduce or eliminate this slippage. "Slippage" means the difference between a wheel's rotational speed (the ground speed that should result from a wheel rotating at the rotational speed) with the ground speed of the vehicle. While only one block is illustrated in FIG. 3, there are four such blocks in actuality, one for each of the driven wheels of the vehicle. Controller 214 is therefore configured to calculate and control wheels slip for each of the four wheels independently.

To control slippage, controller 214 combines a default motor speed calculated for each motor using motor lookup table 316 with a compensation signal for each motor generated by second compensator circuit 314, at summing junction 320 and applies this combined signal to each motor over line 322.

When the wheel rotates with slippage, the signal generated by comparison block 312 will indicate an actual speed difference between the actual speed of the vehicle (block 302) and the speed of the wheel (line 311). If there is no wheel slippage, the signal generated by comparison block 312 will be zero.

As mentioned above, controller 214 is configured to control wheel slip using compensator circuit 314. This may require maintaining a predetermined amount of wheel slip determined to be most efficient for vehicle operation, or it may require eliminating wheel slip altogether.

To set the displacement of each motor (which controls motor speed and wheel slippage), controller 214 takes the commanded vehicle speed (block 300) and looks up a corresponding value for the default displacement of the motor in motor current lookup table 316. The table is called a motor current lookup table, because in the preferred embodiment the motor changes its displacement proportionate to the current applied to signal line 216. Controller 214 then applies the signal it looks up in table 316 to the motor in block 308 to set its specific displacement.

If any wheel slips, however, controller 214 senses this slippage and generates in second compensator circuit 314 a secondary displacement signal that is summed together with the default displacement signal generated by the lookup table (block 316). The default and the secondary motor displacement values are summed in summing junction 320 and are then provided as a combined signal to the motors in block 308. It is this secondary displacement signal calculated by the second compensator circuit 314 that adjusts the default motor displacement in order to control wheel slip.

The steps of looking up a default motor displacement signal (block 316) and calculating a compensating second motor displacement signal (block 314) are performed independently for each wheel and motor combination. There may be a single motor displacement lookup table, or there may be multiple lookup tables, one for each wheel and motor pair, depending upon the type of motors, and the size of the wheels, for example.

The secondary displacement signal calculated in block 314 is selected to reduce the slippage, preferably by reducing the torque applied by the slipping motor to its associated wheel. In block 314, controller 214 calculates a secondary displacement signal that (when combined with the default value provided by the lookup table in block 316) will reduce the torque generated by the motor that is connected to the slipping wheel. By reducing the torque, the wheel is no longer driven hard enough to slip, and eventually regains good contact with the ground.

In the arrangement shown in FIG. 2, there are four motors connected in parallel with one another and collectively connected in series with the pump. To reduce the torque applied to a motor that is slipping, controller 214 in block 314 reduces the specific displacement of the motor connected to the slipping wheel. By reducing the specific displacement, each volume of fluid passing through the motor will cause it to rotate more (i.e. through more revolutions or a greater angle). If the specific displacement of the motor is reduced by half, for example, the motor will rotate twice as many turns as it would for the same volume of fluid passing therethrough.

In effect, the slipping motor's resistance to fluid flow increases significantly when the specific displacement is reduced. The fluid output of the pump, in response, follows the path of least resistance and is conducted through the other three motors instead of passing through the slipping motor.

This increased flow through the other three motors (whose specific displacement has not been changed) will cause them to rotate faster. This faster rotation would normally cause the vehicle to speed up. As described above, however, the compensator circuit 304 compensates for these fluctuations in vehicle speed above the target or command speed 300, and decreases the specific displacement of the pump accordingly.

Thus, not only does the system individually control the displacement of each wheel motor in response to slipping sensed at each wheel, it also automatically corrects the displacement of pump 202 to compensate for any such changed motor displacement that results in the vehicle speeding up or slowing down. The system therefore automatically reduces the specific displacement of pump 202 when one or more wheels slip in order to maintain the vehicle at a constant velocity.

When the speed of the slipping wheel responds to the reduction in motor torque and again engages the ground, the difference between the actual vehicle speed and the speed of the wheel decreases toward zero, and the secondary motor displacement signal likewise decreases toward zero. The result is that the specific displacement of the motor driving the formerly slipping wheel increases, and approaches the default value. By increasing the specific displacement of the motor, the motor torque is increased and the fluid flow through the motor also increases.

When the specific displacement of the slipping motor is increased, its resistance to fluid flow is decreased and more fluid begins to pass through the previously slipping motor. This increased flow through the motor reduces the flow available to the other three motors, and the vehicle will tend to slow down. The compensator circuit 304 automatically responds to this reduction in actual vehicle speed 302 by increasing the displacement of pump 202 accordingly.

Thus the system automatically increases the specific displacement of the pump when a previously slipping wheel ceases slipping to maintain the vehicle at a constant velocity.

In the preferred embodiment discussed above, controller 214 is configured to monitor the speed of the wheels and to independently control their speeds and hence their slip by varying the displacement of each individual motor/wheel pair. Controller 214 controls slip by monitoring the speed of rotation of each wheel and varying the displacement of the motor that is driving the slipping wheel, and varying the displacement of the pump and the other drive wheel motors to compensate for the changes in the displacement of the motor driving the slipping wheel.

In a similar fashion, controller 214 is configured to "power turn" (turned by skidding the wheels) the combine. This operational requirement is satisfied by varying the displacement of the hydraulic motors.

Controller 214 is also configured to prevent the wheels from locking.

It will be obvious to those skilled in the art that various changes may be made without departing from the scope of the invention and the invention is not considered to be limited to what is illustrated in the drawings and described in the specification.

What is claimed is:

1. A method for reducing wheel slip in an agricultural combine including a chassis; an internal combustion engine mounted on the chassis; a rotor configured to thresh agricultural plant matter, the rotor coupled to the engine to be driven thereby; a header fixed to the front of the chassis and disposed to gather and cut the agricultural plant matter; a ground drive system including a variable displacement hydraulic pump coupled to the engine to be driven thereby, four variable displacement hydraulic motors coupled together in parallel to one another and coupled in series with the hydraulic pump to be driven by the pump, and four ground-engaging wheels, each wheel coupled to an associated one of the four hydraulic motors to be driven thereby; and an electronic control system including, four speed sensors, each sensor disposed to sense the rotational velocity of a corresponding one of the motors or a corresponding one of the wheels, a means for determining the speed of the vehicle, and an electronic controller coupled to the four speed sensors, the method comprising the steps of:

electronically retrieving a first wheel speed from one of the four speed sensors;

comparing the first retrieved speed with a reference speed;

reducing the torque applied by the motor associated with said one of the four speed sensors based upon the results of the step of comparing the first speed;

electronically retrieving a second wheel speed from said one of the four speed sensors after the step of reducing the torque;

comparing the second retrieved speed with the reference speed; and reducing the torque applied by the motor associated with said one of the four speed sensors based upon the results of the step of comparing the second speed; and increasing the torque applied by the motor associated with said one of the four speed sensors based upon the results of the step of comparing the second speed.

2. The method of claim 1, wherein the step of reducing the torque includes the step of reducing the specific displacement of the motor associated with said one of the four speed sensors.

3. The method of claim 2, wherein the step of increasing the torque includes the step of increasing the specific displacement of the motor associated with said one of the four speed sensors.

* * * * *